United States Patent [19]

Burger et al.

[11] 3,911,223

[45] Oct. 7, 1975

[54] CIRCUIT ARRANGEMENT FOR SUBSCRIBER STATIONS IN TELECOMMUNICATIONS INSTALLATIONS, ESPECIALLY TELEPHONE INSTALLATIONS WITH AUXILIARY DATA TRAFFIC

[75] Inventors: Wolfgang Burger; Werner Vollmeyer, both of Munich, Germany

[73] Assignee: Siemens Aktiengesellschaft, Berlin & Munich, Germany

[22] Filed: Jan. 9, 1974

[21] Appl. No.: 431,909

Related U.S. Application Data

[63] Continuation of Ser. No. 204,145, Dec. 2, 1971, abandoned.

[52] U.S. Cl. ......... 179/2 DP; 179/84 VF; 179/90 K

[51] Int. Cl.² ......... H04M 11/06

[58] Field of Search ............ 179/2 DP, 90 K, 90 BB, 179/84 VF, 3, 4, 81 R, 99

[56] References Cited

UNITED STATES PATENTS

| | | | |
|---|---|---|---|
| 3,305,635 | 2/1967 | Kadis | 179/2 DP |
| 3,482,051 | 12/1969 | Baade | 179/84 VF |
| 3,496,302 | 2/1970 | Gasser | 179/84 VF |
| 3,665,489 | 5/1972 | Vollmer | 179/90 K |
| 3,700,814 | 10/1972 | Spraker | 179/84 VF |

FOREIGN PATENTS OR APPLICATIONS

| | | | |
|---|---|---|---|
| 1,242,672 | 6/1967 | Germany | 179/84 VF |

*Primary Examiner*—Kathleen H. Claffy
*Assistant Examiner*—Thomas D'Amico

[57] ABSTRACT

Apparatus is described for use in telecommunication subscriber stations, e.g., telephones, having keyboards for dialing tone frequency, character-representing signals. The apparatus particularly finds use in stations where, in addition to the signals for forming connections, signals are generated from the keyboard for transmitting data. An auxiliary bistable switching device is added to the subscriber station. This device is actuated at the beginning of data transmission, after the completion of the connection, so that in its activated or operative position it connects the subscriber station character generator of the keyboard to the subscriber connection line. The completion of the latter connection causes the transmission of a tone frequency indicating the presence of data traffic. Data characters are generated by changing the frequency of the character generator.

5 Claims, 1 Drawing Figure

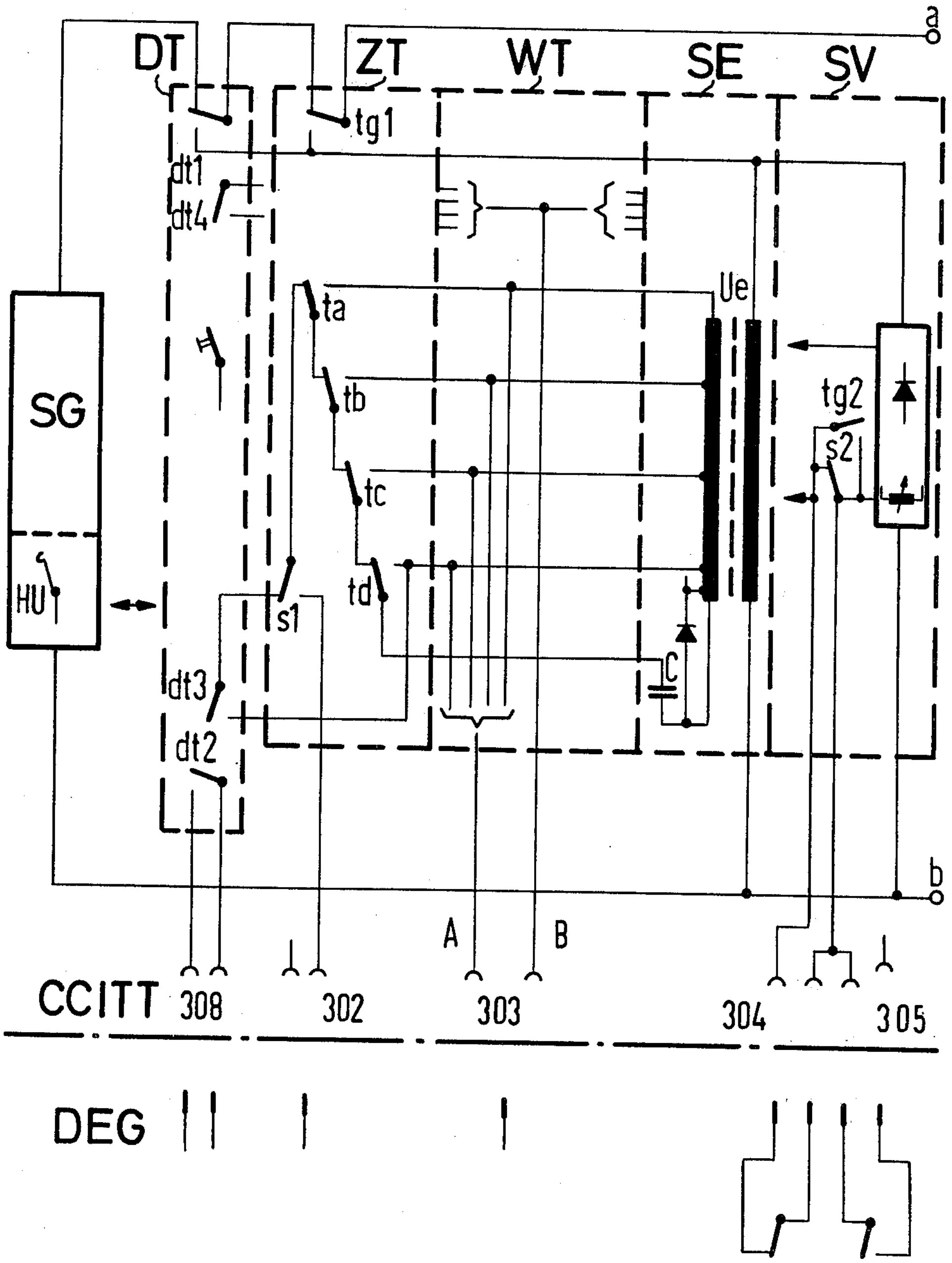
a
DT
ZT
WT
SE
SV
tg1
dt1
dt4
ta
Ue
tb
tc
td
tg2
s2
SG
HU
s1
dt3
dt2
C
b
A
B
CCITT
308
302
303
304
305
DEG

CIRCUIT ARRANGEMENT FOR SUBSCRIBER STATIONS IN TELECOMMUNICATIONS INSTALLATIONS, ESPECIALLY TELEPHONE INSTALLATIONS WITH AUXILIARY DATA TRAFFIC

This is a continuation of Application Ser. No. 204,145, filed Dec. 2, 1971 now abandoned.

BACKGROUND OF THE INVENTION

This invention relates to apparatus for use in subscriber stations in telecommunication installations, and is especially useful in telephone installations having supplemental data traffic.

It is known in the art to utilize existing telephone networks for the transmission of digital data. For this purpose, devices which convert data signals delivered by the end apparatus, as a rule in the form of direct current steps, into tone frequency signals are connected to the communication lines by special connecting devices. An analogous operation applies to incoming tone frequency data signals. The conversion of the signals is necessary, so that separation points for direct current signals lying in the path of a connection can be traversed without difficulty. Secondly, for known reasons, alternating current signals can better be transmitted over larger distances.

To represent the individual characters, series codes, as well as parallel codes are utilized. In the latter mentioned type of code, the individual characters are generally formed by several simultaneously occurring tone frequencies, for example, according to a 2×(1 of 4)-code. So that the character sequence can be clearly recognized, especially in case of successive identical combinations, in each instance a special code combination is transmitted between two characters. This so-called rest combination is formed of the highest frequency of the available tone frequencies.

So that desired subscriber end apparatus can also enter into communication with each other in data transmission, the CCITT (Comite Consultatif International Telegraphique et Telephonique) has issued recommendations (See CCITT document COM-Sp.A-No. 193) for signal converters of this type. These recommendations fix the frequencies and character combinations to be utilized as well as the conditions for the section location between the converter and the data end apparatus.

Further, it is known, as well, to utilize the telephone itself as the end apparatus for simple data services, whereby the data input is executed by means of the dialing device, while a data output is possible in the form of announcements over the telephone receiver.

A telephone with push-button dialing and tone frequency character emission offers special advantages, since these characters can be transmitted without conversion; however, special measures must be undertaken so that dialing signals can be distinguished from data signals. All known solutions, i.e., direct current key signals, auxiliary keys for special signals, which must be pressed before each data character, and simultaneous activation of two character keys, have not been satisfactory.

The invention described herein pertains to a circuit arrangement for subscriber stations with punch-button dialing for generating tone frequency characters, for example, according to the 2×(1 of 4)-code in telecommunication installations, especially telephone installations. In addition to technical characters having to do with the exchange switching operations, other tone frequency characters, such as data, are sent out by the subscriber set and passed to a data receiver, for example, a data processing installation, upon the formation of a connection.

It is an object of the invention to provide a circuit arrangement of this type whereby the data traffic can be developed more simply and reliably.

It is another object of this invention to provide apparatus of the described type which will permit the connecting of additional, already existing data input apparatus corresponding to the recommendations of the CCITT.

SUMMARY OF THE INVENTION

The foregoing and other objects are achieved in accordance with the invention by providing an additional bistable switching device in the subscriber set to be activated at the beginning of the data transmission. The operating position (on-position) of the bistable device connects the character generator of the dialing keys (dialing push-buttons) to the subscriber connection line and causes the sending of a tone frequency character signal as a "rest" character indicating the presence of data traffic. The sending of data characters takes place by changing the frequency of the character generator.

The bistable switching device can, for example, be a locking key or of a key controlled switching element in the form of the contacts of a holding relay, which can be connected between the speech wires of the connecting line, thereby assumes the function of the connecting device for a signal converter, which in the present case is already present. The rest character, which is sent as long as the bistable switching device is in the operating position makes possible the identification of the data transmission in all of the exchanges through which the connection passes. Thus, in a simple manner, the possibility exists of suppressing for the entire duration of a data transmission technical signals related to exchange operation, such as for example, ringing or switching to long distance. Also, the emission of characters is simplified since in any given case only a single character key is to be activated to the desired data character; each key activation causes a change of frequency of the character generator. Also, as a result of the continuous key in the transmission of data, which is equivalent to a multistage frequency modulation, there exists a higher measure of safety against disturbances.

A further advantage results from the fact that a subscriber station, equipped with the inventive apparatus, can in large measure be conformed to the recommendations of the CCITT by appropriate selection of the frequencies. Therefore, it is possible without further measures to take over the service operation necessary with the intermediate connection of signal converters.

In addition to a change of frequency of the character generator through the keys of each station's own dialing key arrangement, according to a further embodiment of the invention, a change of frequency is likewise possible through special data input apparatus, for example, through a punch card reader. Special signal converters can be omitted and in their place the subscriber station takes over this function.

An especially advantageous feature of the invention permits special data input apparatus to be connected to the subscriber station through plug connections and the section location fixed by this plug connection corresponds to the CCITT recommendations.

Another advantage is that upon the extinction of a connection by the subscriber, the additional switching device can be automatically changed over to the rest position (off-position), so that a special operation to return the bistable switching device to the rest position is not necessary. The return operation can take place using locking keys through a mechanical linkage with the receiver switch of the subscriber station or by using a holding relay with return activation over contacts connected to the receiver switch.

In using the invention, an increased meaasure of safety against disturbances can be achieved in that during the transmission of a character the speech apparatus of the subscriber station is disconnected so that even in noisy areas no disturbance noises can reach the connection line.

BRIEF DESCRIPTION OF THE DRAWINGS

The principles of the invention will be best understood by reference to a detailed description of a preferred embodiment thereof given hereinbelow in conjunction with the single FIGURE drawing which is a schematic diagram of the pertinent portions of a subscriber station of known construction having added thereto the apparatus of the invention.

DETAILED DESCRIPTION OF THE DRAWINGS

In the drawing are shown two speech wires a and b of a subscriber connection line connected to a dialing keyboard WT. The dialing keyboard WT breaks down into three parts; namely, a power supply SV, a character transmitter SE having frequency determining members and a push button unit ZT. Only selector contacts *ta* through *td* and the frequency determining elements Ue and C, (drawn only for one frequency group) with a coding according to the 2×(1 of 4)-principle are indicated. Of course, other code combinations may be used. Common key contacts, which are activated when any of the character keys is activated, are designated by *tg*. The contact *tg*1 separates the remainder of the station circuit from the connection line and connects the dialing keyboard WT to the connection line.

In addition to these known units, the FIGURE illustrates a bistable switching device DT, which is controlled by an operating key and has several contacts *dt*.

Contact *dt*1 fulfills the same function as the common key contact *tg*1. Through this contact the remaining station circuits are likewise disconnected from the connection line and the dialing keyboard WT is connected instead. Analagous to the selector contacts *ta* through *td*, with contact *dt*3 closes the oscillation circuit for the generation of the highest frequency in the one frequency group. The same holds with reference to contact *dt*4 and the other, unshown frequency group. The contact arrangements are so made that with the activation of one of the numeral keys ZT the oscillation circuit closed through the rest contact *ta* through *td*, opens and the transmission of the rest character combination is prevented during the transmission of a data character.

With a station of this type there results the same mode of operation in the carrying out of data traffic as in the known devices with special signal converters beginning with a connection to a desired data receiver, formed in the conventional manner. After formation of the connection, a receipt signal in the form of a continuous tone or an answer from a vocoder, which can be monitored with the telephone receiver, is sent from the data receiver. After arrival of this receipt signal, the transmission of data is begun by activation of the data key on switching device DT. At this point, by means of contact *dt*1, the remaining station circuit is disconnected from the connection line and instead, the dialing keyboard WT, which replaces the signal converter, is connected. The transission of the rest character is effected over contacts *dt*3 and *dt*4, and this character is sent for the duration of the entire transmission of data. The rest character is only interrupted by the actual data characters. The data characters are thereby generated, like the dialing characters, with the numeral keys of the dialing keyboard.

As soon as all data is sent out, by again activating the data key on DT, the subscriber apparatus is switched from transmit to receiver in that the dialing keyboard is disconnected again, and instead, the remaining station circuits are reconnected. The subscriber is thereby in a position to receive answering signals in the form of tones or speech sent back by the data receiver. The switchover from transmit to receive is perceived in simple manner at the location of the data receiver through the switching off of the rest signal.

With a renewed activation of the data key, the subscriber apparatus can once again be switched over to the transmitting condition.

The alternation between transmitting and receiving can be repeated thereby any number of times. The extinction of such a connection takes place by simply hanging up the receiver. So that extinction of the connection is guaranteed, even when a bistable switching device activated by the data key is in the operating position, the bistable switching device is connected with the receiver switch of the station in such a way that when the telephone receiver is hung up, the bistable switching device is likewise switched over to the rest position.

Without significant modifications, other known data input apparatus indicated symbollically as DEG can likewise be connected to a subscriber station constructed in this way. Such a connection can advantageously take place through a plug connection, as indicated in the lower portion of the drawing. The connection lines 302 through 308 correspond to the CCITT recommendations. The data input apparatus is notified, using contact *dt*2, over the connection line 308 that the transmission line is connected. The connection of the transmitter portion is controlled through line 304, and the connection of the receiver portion of the station is controlled over line 305. The data to be sent out is determined over line 303, and the connection lines 302 represent the return lines for the transmitting circuit. The control of lines 302 and 304 or 305 is thereby dependent on contacts *s*1 and *s*2, which are automatically operatively connected when an auxiliary data apparatus DEG is connected to the station. The contact *s*1 thereby makes sure that the sending out of the rest signal can be made dependent on the contacts of the data input apparatus, while over contact *s*2 the sharpening of the transmitting device SE takes place from the data input apparatus DEG. The key contact *tg*2 makes sure that when the data input apparatus is connected, an input of data with the numerical key ZT, for example, in alternation with the input from the data input apparatus, is still possible.

Having described the portion of the subscriber station improved according to the invention it should be noted that the remainder of the subscriber station, including the speech apparatus, is of conventional construction and is illustrated as element SG.

The preferred embodiment described hereinabove is only exemplary and should not be considered as determinative of the scope of the invention. The appended claims must be referred to for that purpose.

We claim:

1. Apparatus for telecommunication subscriber stations having dialing keyboards from which are generated tone frequency signals used for completing connections between the subscriber station and a receiving station and for sending data characters to the receiving station, comprising;

character generator means for producing said tone frequency signals responsive to operation of said keyboard, subscriber connection line means extending from the subscriber station over which information is transmitted, bistable switching means having operating and non-operating positions for connecting said character generator to said subscriber connection line in the operating position at the beginning of data transmission including means for causing the sending of a predetermined tone frequency as a rest signal, said predetermined tone frequency being interruptable upon the sending of data signals, thereby indicating that signals substituting for said rest signal are data signals.

2. The apparatus defined in claim 1 further comprising:

means responsive to the replacement of a subscriber hand set for changing said bistable switching means to said non-operating position.

3. The apparatus defined in claim 1 wherein said frequency changes in said character generator are actuated from said keyboard.

4. The apparatus defined in claim 1 further comprising:

means for receiving signals from external data input apparatus and for changing the frequency of said character generator responsive to same.

5. The apparatus defined in claim 1 further comprising:

means responsive to the existence of data traffic for disconnecting the speech apparatus in the subscriber station.

* * * * *